United States Patent [19]

Ayres et al.

[11] Patent Number: 5,235,692
[45] Date of Patent: Aug. 10, 1993

[54] DISK ROTATIONAL POSITION CONTROLS FOR CHANNEL OPERATIONS IN A CACHED PERIPHERAL SUBSYSTEM

[75] Inventors: Kathryn J. Ayres; Brent C. Beardsley; Keith A. Bello; Michael T. Benhase; Donald M. Nordahl; Raymond E. Wilsey, all of Tucson, Ariz.

[73] Assignee: International Business Machines Corporation, Armonk, N.Y.

[21] Appl. No.: 576,044

[22] Filed: Aug. 31, 1990

[51] Int. Cl.⁵ .................... G06F 9/00; G06F 13/00; G06F 12/08
[52] U.S. Cl. .................... 395/425; 395/600; 364/DIG. 1; 364/239; 364/240.5; 364/243.2; 364/243.41; 364/243.42; 364/246.1; 364/248.1; 364/260; 364/268
[58] Field of Search ........... 395/425, 250, 600, 275, 395/400; 364/DIG. 1, DIG. 2

[56] References Cited

U.S. PATENT DOCUMENTS

| | | | |
|---|---|---|---|
| 4,218,742 | 8/1980 | Carlton et al. | 395/325 |
| 4,466,059 | 8/1984 | Bastian et al. | 395/250 |
| 4,571,674 | 2/1986 | Hartung | 395/250 |
| 4,574,346 | 3/1986 | Hartung | 395/425 |
| 4,583,166 | 4/1986 | Hartung et al. | 395/425 |
| 4,638,425 | 1/1987 | Hartung | 395/425 |
| 4,780,808 | 10/1988 | Moreno et al. | 395/800 |
| 4,875,155 | 10/1989 | Iskiyan et al. | 395/425 |
| 4,920,478 | 4/1990 | Furuya et al. | 395/425 |
| 4,956,803 | 9/1990 | Tayler et al. | 395/425 |
| 4,974,197 | 11/1990 | Blount et al. | 395/250 |
| 4,994,962 | 2/1991 | Mageau et al. | 395/425 |
| 5,142,627 | 8/1992 | Elliot et al. | 395/425 |

Primary Examiner—Michael R. Fleming
Assistant Examiner—Ayaz R. Sheikh
Attorney, Agent, or Firm—Herbert Somermeyer

[57] ABSTRACT

A cached DASD peripheral subsystem is operated in a so-called non-synchronous mode, that is, device operations are not synchronous to the host processor operations. A rate-changing buffer is interposed between the channel attachment for the host processor and the DASD, preferably having a storage capacity for one full DASD track of data. The rotational position for the data records being transferred in either direction, i.e., write or read, are kept in the rate-changing buffer to be kept with the record being transferred through the rate-changing buffer. Each time the peripheral subsystem supplies ending status to the host processor and all records to be transferred are retentively stored in DASD, a record control field and the rotational position of the last record transferred in a chain of commands being transferred the rotational position of such last record, its type, and other control data are stored in a control store separate from any cache directory or track directory in cache. Such rotational position and type indicating information for the last record transferred is used for switching the modes of operation of the peripheral subsystem, error recovery, and for accommodating channel initiated retries.

23 Claims, 5 Drawing Sheets

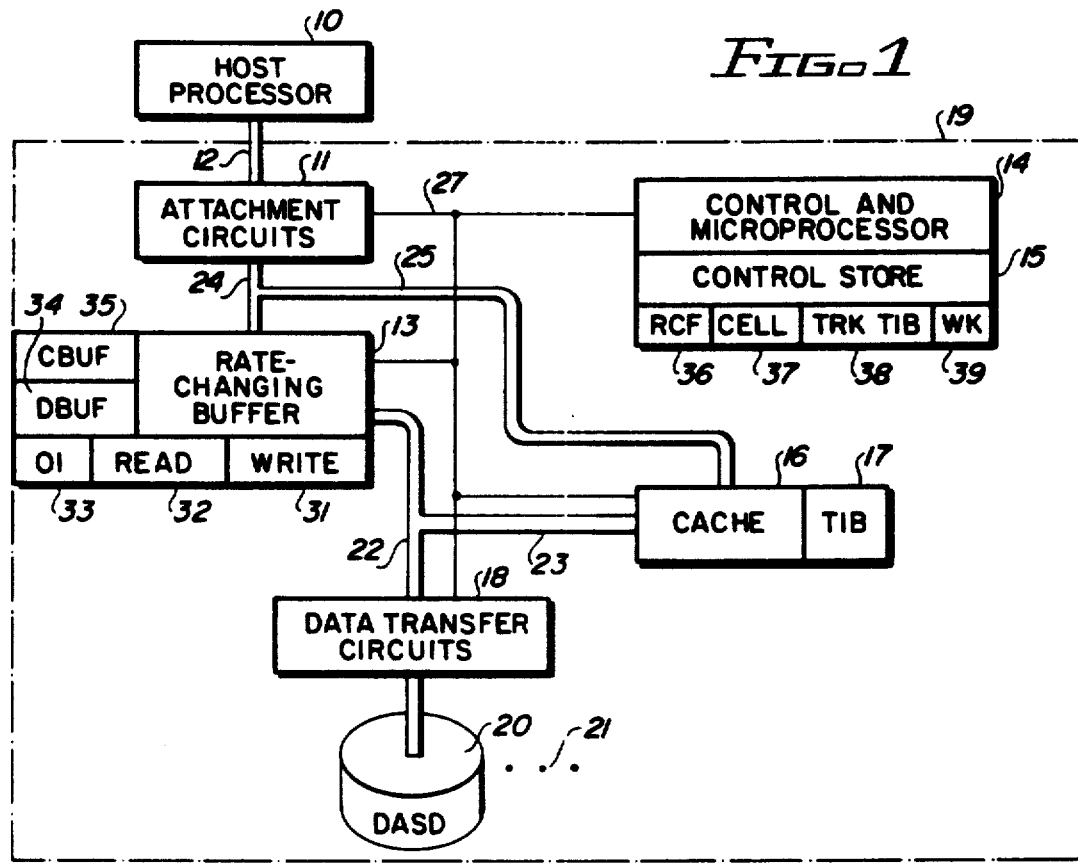
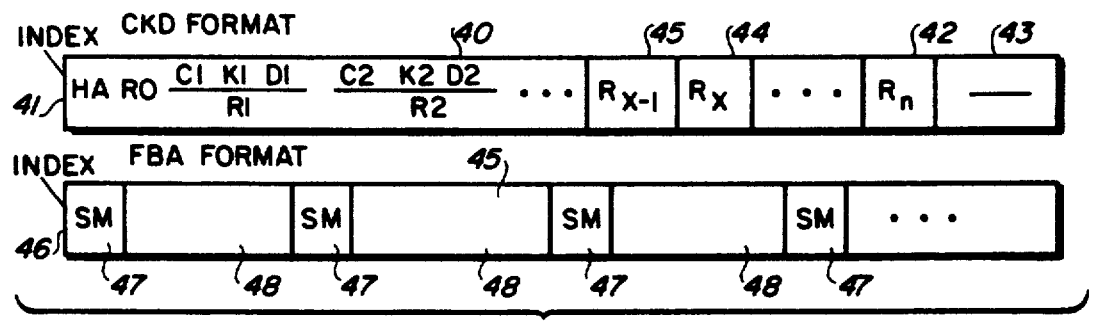
FIG. 2
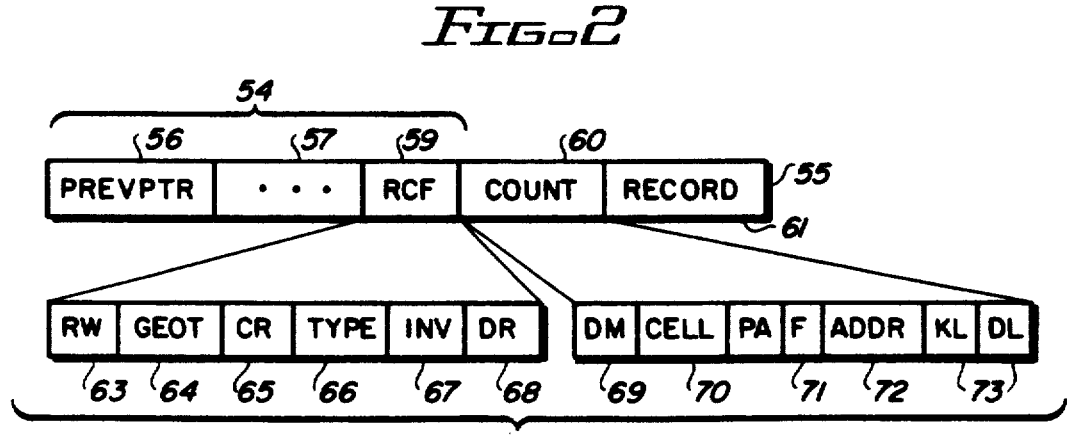
FIG. 4

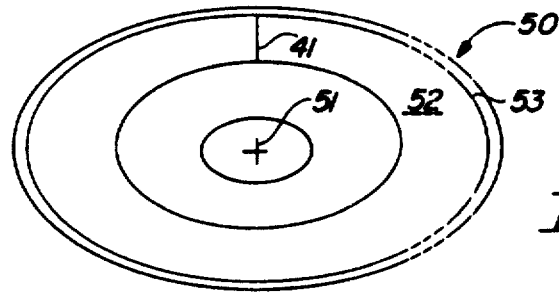
*FIG.3*
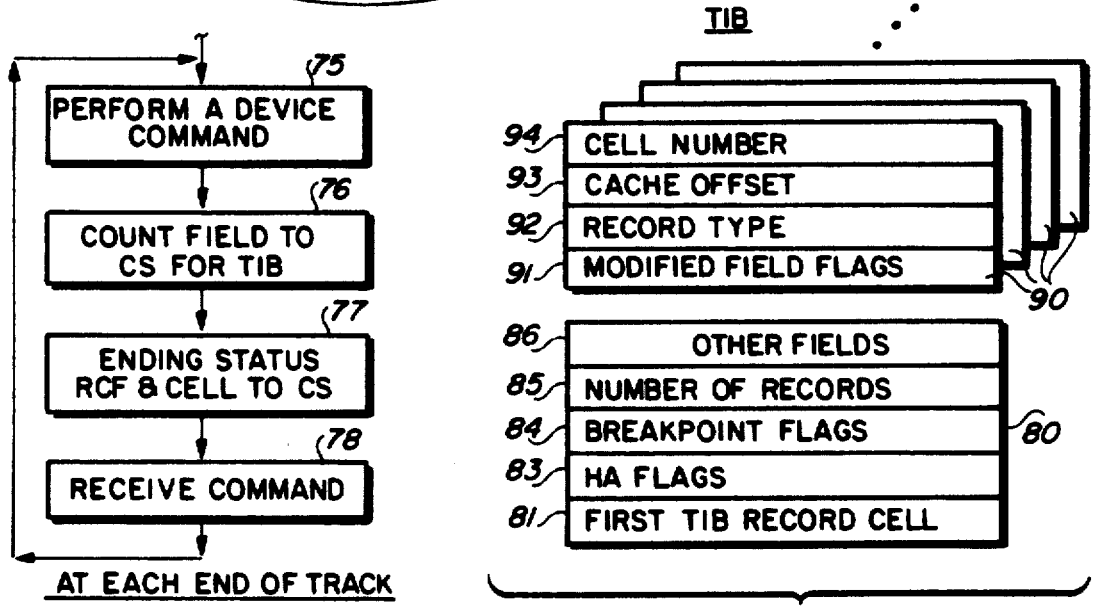
*FIG.5*     *FIG.6*
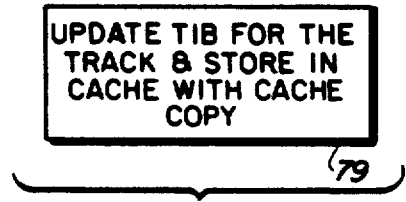
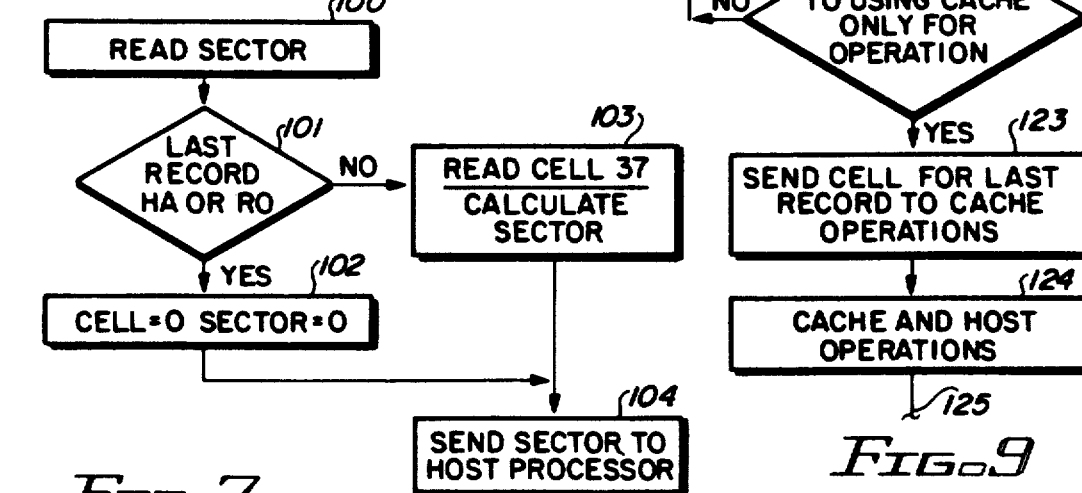
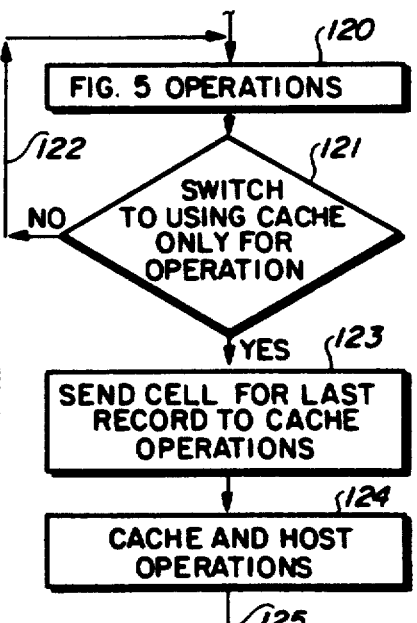
*FIG.7*     *FIG.9*

DISK ROTATIONAL POSITION CONTROLS FOR CHANNEL OPERATIONS IN A CACHED PERIPHERAL SUBSYSTEM

FIELD OF THE INVENTION

The present invention relates to peripheral data subsystems particularly those employing rotating disk storage members or other cyclic devices and wherein the channel to a connecting host processor has a higher burst rate than the data burst rate of the cyclic device within the peripheral subsystem and a long signal propagation time in the serial channel.

BACKGROUND OF THE INVENTION

Direct Access Storage Devices (DASD) usually take the form of a rotating data storage member, such as a magnetic disk, magnetooptic disk, and the like. In most data processing systems, such DASDs are a primary peripheral data storage for operating the data processing system. The format of the data on the DASD includes gaps between various fields of data and control data on such DASD. The arrangement has been such that control interaction between a controller or control unit of the peripheral subsystem and a host processor occurs while the transducer of the DASD is scanning a gap. In this manner, the operation of the host processor and of the peripheral subsystem are synchronized. As data processing systems grew more complex, to maintain the synchronization with reduced time for scanning a gap in high performance DASD limited the cable length between the peripheral subsystem and the host processor. The reason for the cable length limit is signal propagation times. Recently, the use of optical fibers in a so-called serial channel arrangement has been provided in which the burst data rate is substantially higher than of the previous channels, such as a four to one increase. Such serial channel data burst rate is also substantially higher than the data burst rate of present day DASDs. Further, the cable lengths of the serial channels are longer than the prior cable length limits resulting in substantially longer signal propagation times between the peripheral subsystem and host processors. Such cable lengths have prevented the above described synchronized operation between the peripheral subsystem and the host processor, i.e., the signal propagation times prevent effective interaction of the peripheral subsystem and the connected host processor while the transducer is scanning the gap between records or fields on the DASD.

For accommodating longer cable length signal delays in the synchronous mode, the gap lengths in DASD could be increased. Such longer gaps increase delay time between accessing successively scanned records and reduces storage capacity, both effects are undesired.

Another configuration of peripheral subsystems includes a large scale cache interposed between the DASD and the channel connected to the host processor. It is desired to provide efficiency-raising controls in a cached DASD subsystem while maintaining system and data integrity of the data processing system. The operation of such a cached DASD peripheral subsystem is in a so-called "non-synchronous mode" which means that operations between the peripheral subsystem and the host processor are not synchronized to operation of DASD, specifically no control interactions with a host processor are completed while the DASD transducer is scanning a gap. This arrangement of removing the synchronization has to be carefully controlled otherwise unwanted or unintended rotations of the disk between operations could be required. Such additional disk rotations reduce channel utilization and the performance of both the peripheral data subsystem and the entire data processing system. Therefore, it is desired to enhance the operation of such non-synchronous mode such that channel utilization is enhanced. It is to be remembered that each peripheral subsystem may share a serial cable or optical fiber to one or more host processors and that each host processor may be connected to a plurality of peripheral subsystems via the same cable or channel. It is desired to reduce the time each subsystem uses such channel connections for enhancing the channel utilization which thereby increases the productivity of the entire data processing system.

DISCUSSION OF THE PRIOR ART

Effectively, loosening or decoupling relationship of a peripheral device and a connected host processor for enhancing total system performance has been provided in several forms. U.S. Pat. Nos. 4,393,445 and 4,428,064 are examples of a magnetic tape subsystem whose operation is partially decoupled from the operation of a host processor. A data buffer is interposed in the peripheral subsystem controller such that host I/O operation is not slaved to the operation of the tape recorder. The controller assigns record numbers to the blocks of data to be or currently stored on the magnetic tape and the tape recorder. Such records are read into the buffer either from the host processor for recording on the tape or from the tape for forwarding to the host processor. A record counter keeps track of the last record transmitted to the host processor or the first record transmitted from the host processor to the buffer while a second counter keeps track of the last record transmitted to the buffer from the tape recorder or the next record to be transmitted to the tape recorder. Additionally, the tape is divided into large length segments for facilitating rapid searching of the tape independent of host processor operations. Such large segments are identified by a physical reference value PRV. The PRV and the record number are stored at both the channel and device ends of the data buffer for tracking the data within the buffer. Since magnetic tape operation is largely serial and not random as found in DASD, the controls for managing the decoupling of the tape recorder from the host processor operation are relatively simple.

U.S. Pat. No. 4,780,080 shows emulating tracks of a disk storage unit in a solid-state cache. In this patent, FIGS. 4–6 show the emulation and its controls. FIG. 6 shows a header 60 stored with an emulated track in the cache. This header, detailed in FIG. 5 of this patent, enables what is termed "wraparound" control of the data from the track; the term "wraparound" appears to be a synonym for the term "roll mode" as used herein and as shown in Hartung, et al., U.S. Pat. No. 4,583,166. This header includes a pointer to the cache location of record HA (first record identifies the beginning of the logical track as stored in the sectors); the patent shows converting the sector addresses for called target ETP (emulated track position) identifying the first record in a chain of records to be stored in the code, is a measure of the number of bytes between the data disk index and the first record read from the track in the wraparound or roll mode. As each record is read into cache, the ETP is incremented to indicate the increased number of bytes between index and each current record. In other words, the operation of the cache is an electronic simulation of disk rotation.

It appears that the U.S. Pat. No. 4,780,080 described operations are synchronous as set forth above. It is desired to provide a more flexible and simpler procedure for caching data in a peripheral subsystem and for managing and operating the data processing system in a "non-synchronous" mode. That is, when scanning gaps between records and record fields on a DASD, in the synchronous mode, the control interchanging between the control unit and the host processor can be accomplished. The reason for the non-synchronous mode is that the channel characteristics are such that such control interchanging takes longer to accomplish than the elapsed time for scanning such gaps which prevents gap-synchronous operations between the device and the host processor. This problem is not addressed by the U.S. Pat. No. 4,780,808. U.S. Pat. No. 4,920,478 has a teaching which is largely cumulative to U.S. Pat. No. 4,780,808 in that the address information in the cache and the disk relating to the first or starting of the chain of records is used in the control.

A serial channel has been used before for connecting a host processor to a DASD, but without a cache. Examples of these connections are shown in U.S. Pat. Nos. 4,218,742; 4,276,595 and 4,218,759. These patents are cited for showing some subsystem operations for accommodating the propagation delay of the serial channel along with its high data burst rate.

International Business Machines Corporation (IBM) in their publication GC26-4519-0 describe non-synchronous DASD operations in comparison with the synchronous DASD operations. Also ECKD data access commands are described. Such data-access commands are used in practicing the present invention. Particularly DEFINE EXTENT, LOCATE RECORD and write CKD next track, etc. are described. This IBM publication is cited for background information. This publication does not describe the operation of a controller of a cached peripheral subsystem which is designed to operate in a non-synchronous mode.

SUMMARY OF THE INVENTION

It is an object of the invention to provide an enhanced controller for a cached peripheral subsystem for improving operations with a serial channel and with a high performance DASD.

In accordance with a first aspect of the present invention, a machine-effected method of operating a cache DASD subsystem includes exchanging records of data between the serial channel or attachment circuit means with any one of the devices via a rate-changing buffer and placing a copy of each record in the cache.

A header is created for each record which includes a rotational position indicator of the device and an indication of the type of record.

The header indications are stored with the respective record in the rate-changing buffer. At the completion of and exchange of each record, a track information block (TIB) located in a control store is updated, importantly a rotational position indicating cell plus a record type indicator are stored separately from the TIB in a control store for the last record transferred in a chain of records being transferred. To enhance channel and utilization while maintaining subsystem and data integrity the present invention provides various machine operations which utilize the cell and type indications of the last record transferred for effecting diverse operations within the controller.

The foregoing and other objects, features and advantages of the invention will be apparent from the following more particular description of preferred embodiments of the invention, as illustrated in the accompanying drawings.

DESCRIPTION OF THE DRAWINGS

FIG. 1 is a simplified block diagram of a cached peripheral subsystem as attached to a host processor.

FIG. 2 diagrammatically illustrates two different track formats usable in DASD shown in FIG. 1.

FIG. 3 is a diagrammatic plan view of a CKD disk usable in the FIG. 1 illustrated system.

FIG. 4 diagrammatically illustrates data structures useful in understanding the FIG. 1 illustrated system.

FIG. 5 is a machine-operations flow chart showing some machine operations of the FIG. 1 illustrated subsystem.

FIG. 6 is a diagrammatic illustration of a track information block (TIB) used in the FIG. 1 illustrated system.

FIG. 7 is a simplified flow chart showing a peripheral subsystem response to a read sector command from a host processor shown in FIG. 1.

FIG. 9 is a simplified machine-operations flow chart showing an operational use of a separately stored last cell indication of a record for enhancing channel utilization for switching to cache only operations.

DETAILED DESCRIPTION

Figure 10:
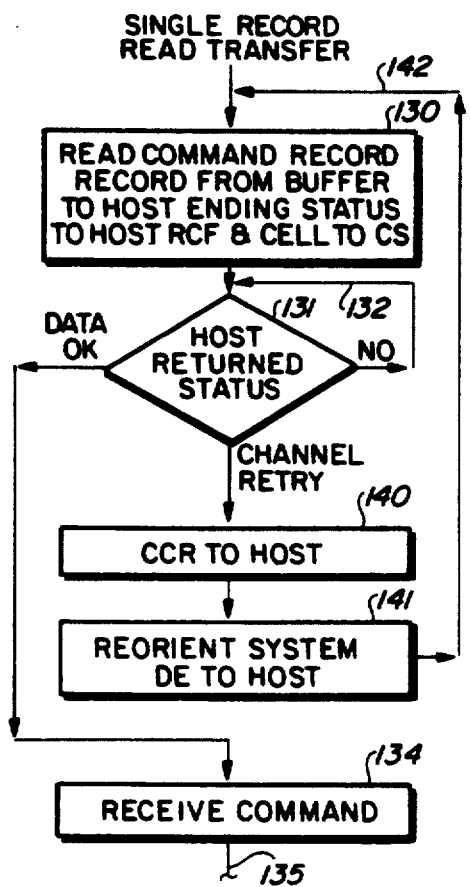
FIG. 10 is a simplified machine-operations flow chart showing a channel initiated command retry for a single record read transfer.

Referring now more particularly to the appended drawing, like numbers indicate like parts and structural features in the several figures. A host processor 10 is connected to a peripheral subsystem 19 via serial channel 12. A rate-changing buffer 13 buffers records of data being transferred between attachment circuit means 11, thereby host processor 10, and DASD 20 via data transfer circuits 18 under control of control and microprocessor 14 (hereafter microprocessor). Rate changing buffer 13 can be similar to rate-changing buffers as shown in U.S. Pat. Nos. 4,218,742, 4,276,595 and 4,218,759. Control of the rate-changing buffer 13 in accordance with the present invention will become clear from a continued reading of this specification. Control store 15 is a high speed random access storage unit used by microprocessor 14 for storing information which is rapidly needed for operating the peripheral subsystem and for responding to requests from host processor 10. Data structures used and practiced in the present invention are stored in control store 15 during later-described machine-operations. Cache 16 is a large electronic random access storage unit for storing copies of the data also stored on DASD 20 and which can be rapidly transferred between host processor 10 and cache 16 over serial channel 12 at electronic speeds. A portion of cache 16 may be a nonvolatile store, i.e., a random access storage unit backed by a battery (not shown). The track information block (TIB) 17 is stored in cache 16 with each copy or usage of data from one DASD track.

The data transfers from the one DASD 20, as well as other DASDs 21 represented by the ellipsis 21, are through data transfer circuits 18, thence over bus 22 to rate-changing buffer 13. For read branching operations, a copy of the data being transferred from DASD 20 to buffer 13 is also stored in cache 16 via bus 23. In a similar arrangement, data records transferred to or from host processor 10 via attachment circuits 11 travel over bus 24 to and from rate-changing buffer 13. For branching operations, the data records supplied by host processor 10 for storage in DASD 20 are also transferred from rate-changing buffer 13 over bus 23 to cache 16 for storing a copy therein. Previously stored copies of such data in cache 16 change the operation of the peripheral subsystem for accommodating such previously stored records. A directory (not shown) for relating tracks on DASD 20 and copies of such data from such DASD tracks in cache 16 is provided, as is known. TIB 17 provides an additional directory function for the location of the records within each track image stored in cache 16.

Microprocessor 14 manages the entire peripheral subsystem 19 through a set of control lines represented by line 27 which extends between a control and microprocessor 14, attachment circuits 11, rate-changing buffer 13, cache 16 and data transfer circuits 18. Data transfer circuits 18 also supply microprocessor 14 generated commands to and status signals from the DASD 20, 21. The later illustrated machine operations are effected through executing microcode in microprocessor 14 in a usual manner.

Rate changing buffer 13 not only includes a buffer portion, but also control areas portions necessary for operating in the illustrated peripheral subsystem 19. Write area 31 stores control data structures when writing data to DASD 20 received from host processor 10. In a similar manner, read portion 32 stores control data structures when a read operation is occurring, i.e., data records are being transferred from DASD 20 to host processor 10 and a copy being branched to cache 16. By providing separate control data structure areas 31 and 32, recovery from errors and changing situations within the subsystem 19 are facilitated. Part of the read portion 32 is an overlay inhibit portion OI 33 which is a control bit for inhibiting record overlaying in rate-changing buffer 13 during retry operations. The location of the first and last records in rate-changing buffer 13 are indicated in count fields DBUF 34 and CBUF 35. CBUF 35 indicates the start-up location of the lass record either received from host processor 10 or being sent to host processor 10. In a similar manner, DBUF 34 indicates the start up location of the last record being received from DASD 20 or being sent to DASD 20.

Control store 15 includes a plurality of rapid-access storage areas for storing data structures used in the practice of the present invention. RCF 36, record control flags, stores type information of a record and other status information as explained later with respect to FIG. 4. Cell portion 37 stores the rotational position of the beginning of the count field of a last record transferred. TRK TIB 38 is one copy of a track TIB used for updating TIB 17 during a data transfer involving one track. WK 39 is an area which is used as a work area for storing control data structures for updating TRK TIB 38 at the end of scanning a track.

FIG. 2 diagrammatically illustrates the format of one track of a DASD such as DASD 20. The count key data (CKD) format is shown in circular track 40 (shown as linear box). Track 40 begins and ends at index 41. The first record adjacent to index 41, i.e., the first record always scanned in the track is a so-called home address record (HA). A gap, not numbered, separates HA from the first record in track 40 called R0 which is record zero, a system or control record used in operating with CKD formatted disks. Following R0 are the user data records R1, R2, etc. through Rn 42, n is a positive integer. Each of the records R1 et seq, consist of at least two fields, the fields being separated by gaps mentioned above. A first field is a count field denominated as C1 in record R1 and a data field denominated as D1 in record R1. A key field K1 is optionally includable in each user record, such as R1. Record R2 is similarly constructed. Record Rn 42 is the last record stored on track 40, the remaining portion 43 of the track preferably being erased or storing data that is not valid for use in the data processing system. In one portion of the ensuing description, it is assumed that track 40 is completely filled with data. Record Rx 44 is the first record of a copy of which is stored in cache 16. That is, all the records from Rx to Rn (portion 43 is non-existent in a full track) the index 41 proceeding to the right as shown in FIG. 2 have a copy stored in cache 16. Storing a "partial track" in cache 16 means storing records Rx 44 through record Rn 42 in cache. In this instance, reading a "DASD" track 40 of data to host processor 10 uses the next-described procedures. When reading data from DASD 20 to host processor 10 the records R1 through Rx-1 45 are read from DASD 20 to host processor 10. At this time, the last record cell indication stored in cell 37 of control store 15 is used for orienting cache 16 to record Rx such that the records stored in cache 16 are then supplied to host processor 10. DASD 20 is then no longer involved in the record transfer for high speed data transfer to host processor 10 for enhancing utilization of channel 12.

Fixed block architecture (FBA) format is shown in track 45. It begins and ends at an index 46. The FBA track is divided into equally sized data-storing sectors or segments 48 each denominated and identified by control field or sector mark (SM) 47. The present invention can be used with the track 45 format; however, because of greater storage efficiencies CKD format of track 40 is preferred. U.S. Pat. No. 4,780,808, supra, shows emulating a CKD formatted data on an FBA formatted disk track. Of course other forms of emulation can be provided. The term sector as used in the FBA format track 45 means the spacing between two successive SM 47s, i.e., one of the data areas 48. There are no such sectors in a CKD formatted track. The term sector is often used in connection with the CKD format for indicating a predetermined number of small circumferential or rotational displacements of a disk which is all logical and not used on the disk, per se. Herein, such small displacements are termed a "cell".

A CKD formatted disk 50 is best seen in FIG. 3. The disk 50 rotates about its central axis 51. An embossed index mark 41 extends throughout a recording area 52 which contains a large multiplicity of CKD tracks 40. A minimal formatting on a CKD track is the recording of records HA and R0 immediately adjacent index 41 and erasing the rest of the track. Sometimes only record HA is recorded. Guard band 53 may be provided between the outer edge of the disk and the recording area 52. Not shown, but used in many DASDs is a servo disk for controlling the radial position of transducers (not shown) as it moves radially across data area 52 of a plurality of disks, respectively, 50. So-called cell boundary markers such markers also designate disk sectors on the servo disk are counted to indicate rotational position of each disk 50. The cell boundaries, and sectors do not precisely indicate the circumferential position of all the data. Such cell positions and sectors are useful for positioning transducers (not shown) over a track sufficiently early such that a record area such as record R2 of FIG. 2 will be scanned with a minimum latency delay of the rotation of the disk 50. Such cells had been used for years for identifying rotational positions on various DASDs. A predetermined number of such cell boundary markings of the servo disk are also termed a "sector". Such a sector is logical in nature and has nothing to do with the practice of the present invention.

FIG. 4 shows an electronic copy of a record 55 in buffer 13 having count field 60 and data field 61 along with a header 54 having control information. When the record 55 stored in buffer 13 is transferred either to data circuits 18 or to attachment circuits 11, the header portion is stripped from record 55. Header 54 includes a reverse pointer 56 (PREVPTR) which points to the previous record in the buffer. Ellipsis field 57 indicates control fields other than these shown which are used in the practical embodiment of practicing the present invention but are not necessary for an understanding of the present invention. RCF field 59 contains the record control flags later described. Count field 60 and RCF field 59 (hereafter RCF 59) are expanded for showing their respective controls.

RCF 59 includes RW field 63 which indicates whether the data record transfer is a read or a write operation. GEOT 64 indicates that any remaining records on this track are not required for a host processor 10 operation commanding the current data transfer. Peripheral subsystem 19 reorients to index 41 (go to end of track—GEOT) and begins reading a next track when this byte is set. CR 65 indicates that a channel related retry is being performed in the peripheral subsystem. Type field 66 indicates the type of record contained in the buffer 13. Four types of records are used in the FIG. 1 illustrated system. One record is a home address record (HA), the second record type is record R0, a third record type is a user record data such as R1, R2, etc. and the fourth is a so-called dummy record indicating that the immediately preceding record in the buffer 13 is the last record Rn 42 stored in the current track of DASD 20. This dummy record indicates the logical end of track enabling the peripheral subsystem 19 to look for the index mark 41 as a next operational step in scanning portion 43 current track 40. INV 67 indicates that a track being scanned on the DASD is invalid. DR 68 indicates a device retry, i.e., this record is the subject of a retry, either reading or writing, with respect to DASD 20.

Count field 60 is a copy of the count field stored on DASD 20. It includes a defect map 69 which shows the circumferential location of defects in the DASD track. The physical address is indicated in two areas indicated jointly by numeral 70. The cell number on the servo disk at which the count field begins is indicated. Additionally, PA indicates a physical address for addressing DASD 20. F field 71 contains flags not pertinent to practicing the present invention. Field ADDR 72 indicates the address of the record in DASD 20. For example, in CKD formatted disks, ADDR 72 contains C,H and R which respectively indicate the cylinder number C, the head number H on the cylinder (which really identifies the recording surface in the stack of disks on the DASD unit) and R the record number assigned by the host processor 10. Numeral 73 denotes the length indicators KL for the key length for key field (K1 of R1, for example) and DL for the record or data length of field 61.

FIG. 5 illustrates, in simplified form, operations of the peripheral subsystem 19 in practicing the present invention. The figure assumes that the subsystem 19 has been previously prepared for the data record transfer. The operation can be either a read or a write operation. At machine-step 75 a device related command, read or write is performed. This device command performance includes transferring records through rate-changing buffer 13 and branching a copy of same to cache 16. At the end of the device function with respect to DASD 20, at machine-step 76 the count field 60 is supplied to control store CS 15 for storage in work area WK 39. Such stored count field will be used later to update the TIB 17. At the channel side of the buffer 13, at machine-step 77 ending status is supplied to host processor 10 over serial channel 12. At this same time whenever all of the records in a transfer of a chain of such records have a retentive copy in DASD 20 the contents of RCF 59 and a copy of cell field 70 (including PA Field) are stored respectively in the RCF 36 and cell 37 portion of control store (CS) 15. During a read operation all the records are retentively stored on DASD 20. Accordingly, when ending status for each read command is supplied to host processor 10, the areas RCF 36 and cell 37 are updated in CS 15. On a write operation, however, RCF 36 and cell 37 are not updated until after the last record of a LOCATE RECORD host processor 10 defined write domain has been recorded on DASD 20 and ending status for the last write command in a chain of such write commands has been completed. An additional host processor 10 issued command is represented as being received at machine-step 78 whereupon another device command operation may be performed at machine-step 75. However, other commands may be performed such that the steps shown in FIG. 5 are not repeated. In addition to the above illustrated machine-operations, and synchronously with DASD 20 oriented operations, microprocessor 14 responds to DASD 20 indicating that index 41 has been scanned for the current track (such scanning is not a result of any unintended extra disk rotations), machine-step 79 uses the control data structures stored in WK 39 to update the TRK TIB 38 and stores same as a part of TIB 17 in cache 16. Accessing a TIB 17 copy in cache 16 is slower than accessing information stored in control store 15; therefore, it is important, in accordance with the invention, to store the cell number of a last record transferred in control store 15. Such separate storage enhances subsystem 19 operations and improves utilization of channel 12.

FIG. 6 illustrates a track entry of TIB 17, such as stored in TRK TIB 38 during a record transfer operation involving the track indicated the TRK TIB 38. There is one copy in TIB 17 of the FIG. 6 illustrated control data structure for each track stored in cache 16. Each such unit constitutes a directory and other control information associated with the cache 16 copy of DASD track data. Each TIB entry includes a header 80. Within header 80 is a field 81 which stores the first TIB record cell. That is, the cell number of the first record of all records stored in cache 16 from the identified DASD track. It should be noted that all records are serially numbered in sequence from index 41 toward the end of the track. Such sequence is fixed. Field 83 contains so-called home address record HA flags which indicate either a copy of the HA is not stored in cache 16 or the cache segment (FIG. 13) assigned to the identified track in which HA is stored. Field 84 stores the so-called break point flags which are used in connection with the roll mode and when a "partial track" is stored in cache 16 of the DASD track 40 represented by the TIB entry. Such flags indicate the cache segment assigned to the identified track in which the first record Rx 44 after the break point actually resides. The record Rx also indicates the first record read from the identified track when using the roll mode. Field 85 indicates the number of records currently stored in cache 16 from the identified track, including HA and R0 records. Numeral 86 indicates that header 80 may contain other fields not pertinent to an understanding of the present invention.

The remainder of the TIB shown in FIG. 6 are sets of record entries, one record entry for each record stored in cache 16 from the identified DASD track. There is one such entry for HA, record zero (R0), record one (R1) through record n (Rn) and the index record, i.e., the dummy record indicating no more records are on the identified track. Such index record is indicated by the type field as being an index record and contains no data. Each of the record entries 90 includes field 91 which contains flags for indicating which portions of the record were updated in cache, i.e., a written to flag. These flags include whether or not the count field 60 was modified, whether a key field (if any) was modified, or the data field 61 was modified. Field 92 indicates the type of record. Field 93 indicates the cache offset or cache address of the record, i.e., the beginning of the record. Field 94 stores the cell number from the count field 60 (FIG. 4). Accessing field 94 for a given record stored in cache 16 requires accessing TIB 17 and scanning the accessed TIB for the field 94 of a desired record. According to the invention, subsystem 19 operation is enhanced by separately storing the cell number of the current central record, i.e. the last record process as described herein.

FIG. 7 indicates the machine-operations on how the peripheral subsystem responds to a READ SECTOR command 100 received from host processor 10. Read sector command refers to the last record processed by the peripheral subsystem 19, i.e., that record whose rotational position is indicated by the contents of cell 37 and the type of such record as indicated in the portion of control store 15 in RCF 36. At machine-step 101, microprocessor 14 determines whether or not the last record was HA or R0, i.e., was the last record next to index 41? If yes, then at machine-step 102 peripheral subsystem 19 under control of microprocessor 14 supplies information to the host processor 10 at step 104 that the sector value is zero, i.e., index 41. If the last record transferred to the buffer 13 is not HA or R0, then at machine-step 103 the peripheral subsystem supplies the number of a logical sector derived from the cell portion 37 of control store 15 to host processor 10. Usually such logical sector is a number which is a sub-multiple of the cell number, i.e., dividing the number in cell portion 37 by 7 or 8, for example, produces a logical sector number. The sector number is sent to host processor 10 at machine step 104. Since cell portion 37 is rapidly available for sending its controls to host processor 10, response time of the peripheral subsystem to the READ SECTOR command is minimal, thereby enhancing channel utilization. If the last record transferred had to be examined through the control structures of rate-changing buffer 13 or through TIB 17, then additional time delays would be incurred which is not desired.

Figure 8:
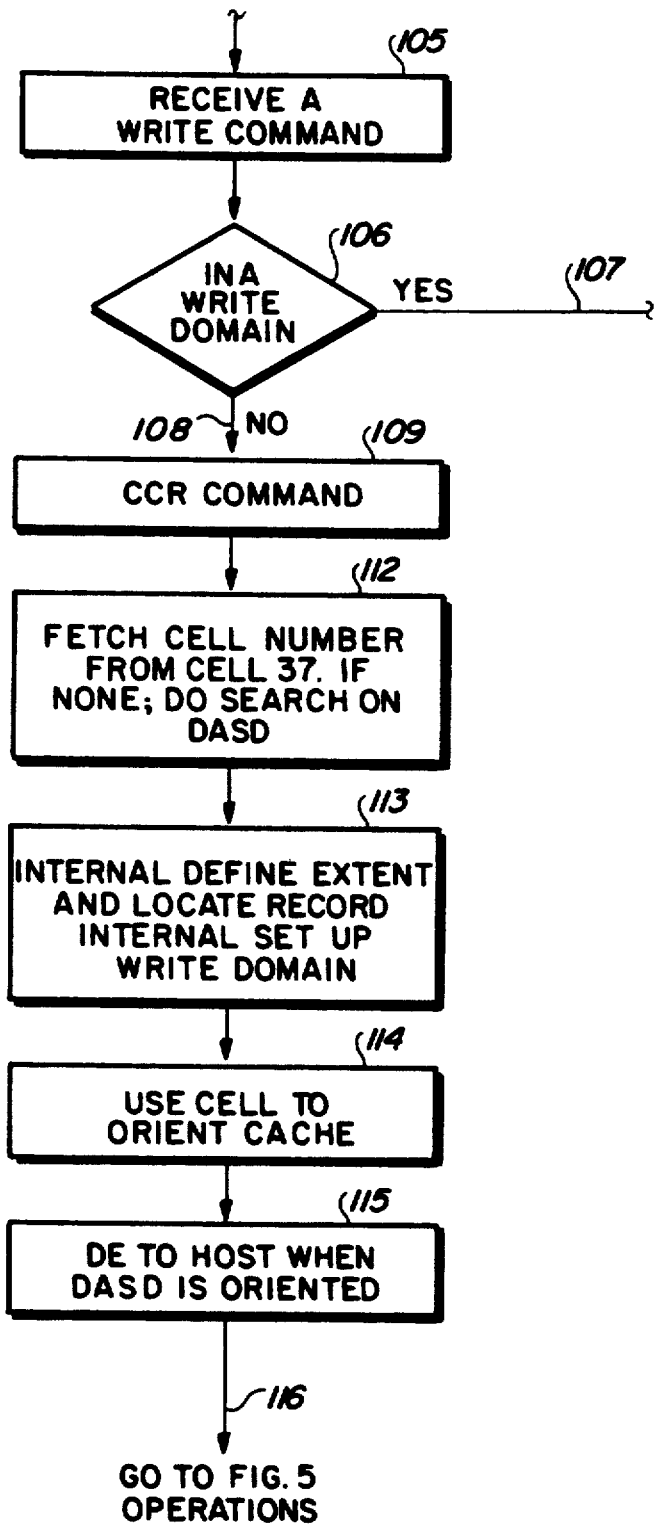
FIG. 8 is a machine-operations flow chart showing operations of a peripheral subsystem receiving a CKD command which prevents unintended extra rotations of a disk when performing the CKD command using the FIG. 1 illustrated subsystem.

FIG. 8 illustrates a set of machine operations in which the contents of cell portion 37 of CS 15, which identifies the last record transferred to rate-changing buffer 13 as above described, is used for emulating CKD commands received from host processor 10 to internally generated ECKD type commands, such commands are best used in the non-synchronous mode. This operation enhances channel 12 utilization. At machine-step 105 a write command is received. If that write command is in a write domain established by a proceeding LOCATE RECORD command in a current chain of commands, then such write command is part of an ECKD set of host processor 10 peripheral commands. In this situation no special handling as will later be described is required and the operation of the peripheral subsystem proceeds over path 107 for recording data on DASD 20 and in cache 16 using a non-synchronous mode of operation. If the write command is not a part of a write domain, then this write command is the type of command used in synchronous DASD operations. Executing this synchronous write command as in a synchronous subsystem results in a single write command requiring two rotations of the disk 50 while host processor 10 remains connected to subsystem 19 over serial channel 12. This extended connection means that the channel utilization of the serial channel 12 is reduced. It is desired to release serial channel 12 for other usage when such a synchronous write command is received. This enhancing begins along path 108 which is the "No exit" from machine-step 106. At machine-step 109 the just received synchronous write command is made subject to a channel command retry (CCR) which is a signal supplied from peripheral subsystem 19 to the host processor 10 indicating that peripheral subsystem 19 has operations to perform before the just-received command can be successfully executed. As a result, peripheral subsystem 19 disconnects from the host processor 10 for freeing the channel 12 for other usage. While disconnected from the host processor 10, at machine-step 112, the cell number stored in cell portion 37 is fetched from CS 15 which relates to the last FORMAT WRITE. Such fetching requires substantially less time than fetching a cell number from TIB of FIG. 6 which is stored in cache 16. At machine-step 113 the peripheral subsystem 19 emulates the synchronous command to a non-synchronous write command in the non-synchronous mode. This emulation action requires the peripheral subsystem 19 to internally set up a write domain. By way of explanation host processor 10 establishes a write domain for writing in the non-synchronous mode in a first chain of commands which is followed by a second chain of commands for effecting the writing or recording of such data records within the identified write domain. Host processor 10 in the non-synchronous mode uses peripheral commands DEFINE EXTENT and LOCATE RECORD. The DEFINE EXTENT command indicates the address space on DASD 20 in which subsequent operations are to be performed, for example, a set of contiguous DASD tracks. For the internal write domain set up, the DEFINE EXTENT portion is dispensed with. In channel commanded operations, the DEFINE EXTENT command is followed by a LOCATE RECORD command which indicates the number of records and other information to be written to DASD 20. Such number of records and their location within the defined extent constitute a write domain. In effect, the LOCATE RECORD command specifies the type and scope of the record transfer operation to ensue. Such command has control parameters which include the number of records to be written, the track, sector and record ID to which direct device must be first oriented prior to initiating the record transfer. The address of the record to be written to or updated on DASD 20 was contained in the received synchronous write (CKD) command; the peripheral subsystem 19 uses this received information for establishing a write domain in machine-step 113. The peripheral subsystem 19 knows (as by measuring) the electronic delays of cable 12 and the time for orienting to the DASD. The previous record written will have its cell stored in portion cell 37 such that at machine-step 114 cache 16 operations are oriented to this cell. At machine-step 115 a DEVICE END (DE) is supplied to the host processor 10 to indicate that peripheral subsystem 19 is prepared to proceed with the previously received and "CCR'd" synchronous write command. Host processor 10 resends the synchronous write command to peripheral subsystem 19. The DASD 20 is then oriented to the cell and the writing actually occurs following the control path 116 to the FIG. 5 illustrated operations.

FIG. 9 illustrates machine-operations using the separately-stored cell indication 37 of the last record transferred for switching to cache-only operations when reading the track of data to host 10 from DASD 20 whenever a predetermined portion of the track is already stored in cache 16. The FIG. 5 illustrated operations occur at machine-step 120. At each iteration of reading a record from DASD to host processor 10, at machine step 121, it is determined whether or not to switch using cache 16 for the rest of the read operation of the current track. That is, referring back to FIG. 2 the records of the CKD formatted track 40 beginning at Rx 44 to the last record Rn 42 are imaged in cache 16, at this time the read operation switches from DASD 20 as indicated by numeral 122 until the record Rx−1 45 is reached. Then records Rx 44 through Rn 42 are read only from cache 16. At machine-step 123 the contents of cell portion 37 are read by the microprocessor 14 and given to the microcode to be executed for orienting the operation of cache 16 to the record located on DASD 20 indicated by the contents of cell portion 37. Once the cache 16 is oriented and record Rx−1 45 has been transferred to rate-changing buffer 13 and to host processor 10, then at machine-operation step 124 beginning with record Rx 44, the read operation proceeds to read only the cache image of the track over bus 25 at electronic speeds to host processor 10. Upon completing the read of the track, either the next track to be read, if any, is read directly from DASD 20 as above described or may continue from cache 16 if the image of that second track also resides in cache 16. All of the above latter described operations are indicated by numeral 125 extending from machine-step 124. FIG.'s 10 and 11 show operations using the contents of cell portion 37 in channel initiated retries for a single record read transfer and for a multiple record read transfer respectively. The FIG.'s 10 and 11 illustrated operations are usable for error recoveries, such as recovery from uncorrected but detected data errors, and the like. In machine-step 130, it is assumed that a chain of commands for reading the data had been entered and is currently being executed. One record is transferred from rate-changing buffer 13 to host processor 10. The usual ending status is sent to the host simultaneously therewith RCF 59 and cell 70 for the just transmitted record are supplied to control store 15 in RCF portion 36 and cell portion 37, respectively. Then at machine-step 131, the peripheral storage system waits for the host processor 10's response to the just supplied ending status. Numeral 132 indicates the wait loop for such host response. Host processor 10 can provide one of two responses, one that the data is valid 9 whereat machine-operations proceed via exit "DATA OK" of step 131 to machine-step 134 for receiving the next channel command. Further machine-operations occur as indicated by numeral 135. On the other hand, if a channel initiated retry is to be performed, then at machine step 140 a channel command retry (CCR) is supplied to host processor 10. At this point in time, the peripheral subsystem 19 disconnects from the channel 12 for increasing channel utilization while it reorients the subsystem 19 operations to the last record at the DASD track or cache 16 location of which is indicated by the contents of cell portion 37 in control store 15. At machine-step 141, cache operations are reoriented to the contents of cell 37 and the record indicated in the RCF portion 36. Then machine-operations follow logic path 142 for receiving the retransmittal of the read command for reading one record whereat the operation is of machine-steps 130 and 131 are repeated.

Figure 11:
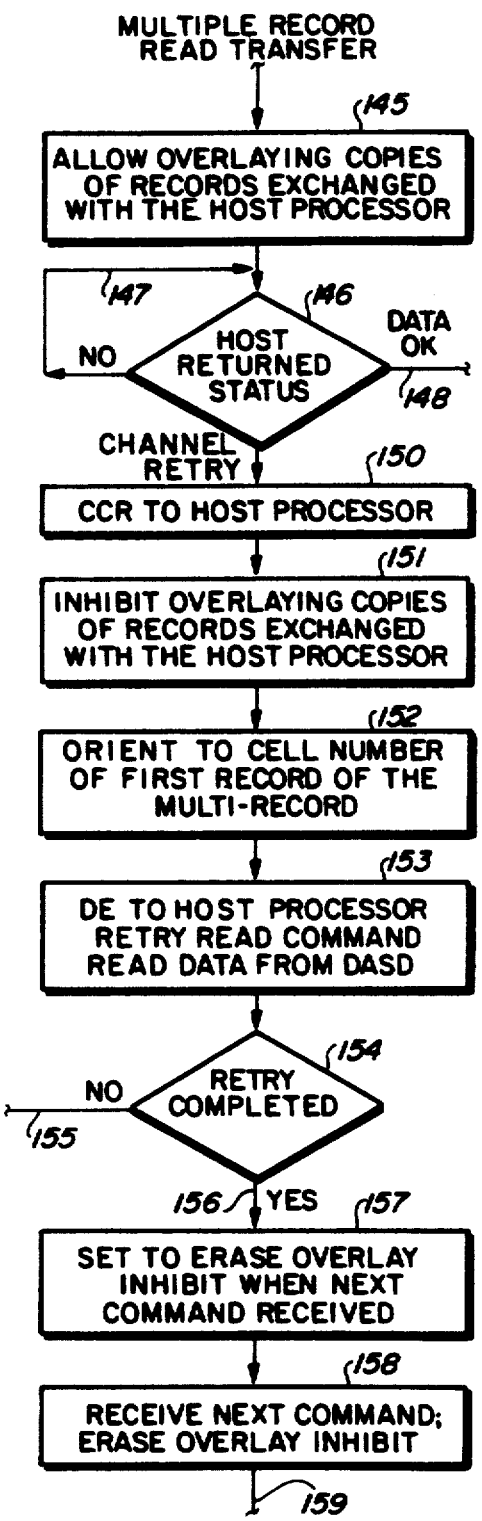
FIG. 11 is a simplified machine-operations flow chart showing operations of the subsystem during a channel initiated retry for a multiple record read transfer.

Referring next to FIG. 11 a similar set of operations is performed for a multiple record read transfer. That is, several records are sent in sequence to host processor 10 using one or more commands. Because of the plurality of records read, it is not known whether or not the contents of rate-changing buffer 13 have been altered such that the contents thereof do not reflect the records actually previously sent to host processor 10. During normal operations, when reading data from device 20 to host processor 10 at machine-step 145, the operation of rate-changing buffer 13 allows overlaying copies of records exchanged with the host processor 10. The term overlaying means that the data buffer space occupied by a record that was sent to host processor 10 and which was acknowledged by host processor 10 can be used for storing another record even though the chain of record transfers is not yet complete. In this regard, it is parenthetically noted that the preferred data storage capacity of rate-changing buffer 13 is that of storage capacity of one track of data on DASD 20. Therefore, the overlaying principle allows data records from more than one track to be simultaneously stored in rate changing buffer 13. However, in a retry, overlaying is not permitted for one track. Then the contents of that track will be in data buffer 13 whereas with overlaying, only those records not sent to host processor 10 from that current track are generated to be in rate-changing buffer 13.

At machine-step 146, the peripheral subsystem 19 waits for the host return status for ending status which was sent to the host processor at the end of transmitting one of the records. Numeral 147 indicates the idle loop waiting for such host response. Normally, the data "OK" path 148 is followed from machine-step 146. On the other hand, if a channel initiated retry signal is received from the host processor 10 in response to the ending status which was sent to host processor 10 during step 145 (see step 130 of FIG. 10), then a CCR is sent to host processor 10 at machine step 150. At machine-step 151 control 14 sets OI bit 33 of the read control portion 32 in rate-changing buffer 13 to the active condition for inhibiting overlaying copies of records exchanged with the host processor 10, i.e., requires that the contents of the current track that had been read for transferring to host processor 10 must all reside within rate-changing buffer 13. This action requires that the storage capacity of rate-changing buffer 13 be sufficient for storing one full track of data or whatever DASD capacity is required, i.e., one-half track, mini-disk (several heads) and the like.

At machine-step 152, the cell number 37 and TRK TIB 38 or in work area 39 are fetched such that the cache 16 and DASD 20 can be oriented to that cell number, i.e., the first record of the multi-record transfer. At machine-step 153 a DEVICE END (DE) is sent to host processor 10 indicating that the retry initiated by the channel can now be performed. Then data is read from the DASD 16 with a branching to cache 20 for the entire operation. At machine-step 154 it is determined whether or not the retry has been successfully completed. If not, machine-operations proceed to other error recovery procedures beyond the scope of the present description, all as indicated by numeral 155. If the retry was successfully completed, then from machine step 154 machine-operations proceed over path 156 to machine-step 157. Machine-step 157 primes microprocessor 14 for erasing the overlay inhibit byte OI 33 (FIG. 1). When the next command is received, at machine-step 158, from host processor 10, OI byte 33 is erased and the machine-operations proceed along path 159 in accordance with the commands received from host processor 10.

Figures 12, 14:
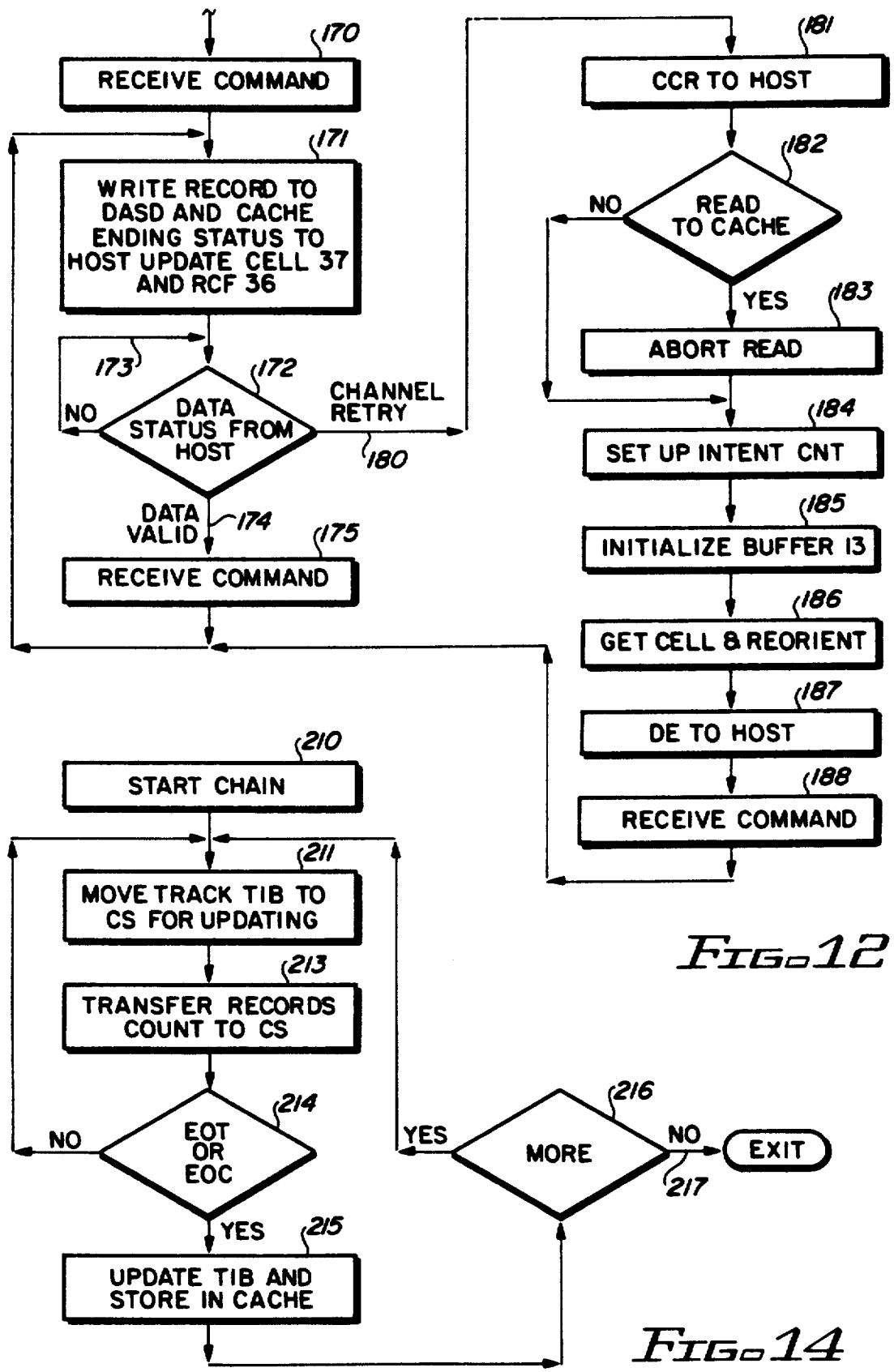
FIG. 12 is a simplified machine-operations flow chart showing a channel initiated retry for write operation which is one practice of the present invention.
FIG. 14 is the simplified machine-operations flow chart showing the general operations for updating TIB.

FIG. 12 shows a channel initiated command retry for a write command. A write command is received at machine-step 170. The data record is written to DASD and cache at machine-step 171. At machine-step 172, the peripheral subsystem 19 waits for a response from host processor 10 based upon ending status supplied to host processor 10 at machine-step 171. Numeral 173 indicates the wait loop to wait for such signals. If the data sent to host processor 10 is valid, then microprocessor 14 exits machine-step 172 over path 174 to receive another command at machine-step 175, whereupon the next record is written to DASD 20 and cache 16 at repeatable machine-step 171. Of course, other commands may be received from host processor 10 which may abort the write operation, such an operation is beyond the scope of the present description. On the other hand, at machine-step 172 if a channel initiated command retry is indicated in response to the ending status, the peripheral subsystem 19 then proceeds over path 180 to machine-step 181 which sends a CCR to host processor 10. In machine-step 182, the peripheral subsystem 19 determines whether or not data from DASD 20 is being read into cache 16 for completing an image copy of the DASD track; i.e. cache 16 may be storing a partial track image of the current track and the records HA to Rx−1 are being staged from DASD 20 to cache 16. For example, the channel initiated retry may be for writing record R1 42 in field 40. partial track read of records Rx through Rx. Subsystem 19 after such a write command could stage records HA through Rx−1 45 to cache 16. If such data records are being currently read from DASD to cache, i.e., staging the data from the DASD to create an image of such data in cache 16, then a machine-step 183 such staging operations are aborted. If there is no read operation in effect between DASD 20 and cache 16 or from step 183, at machine-step 184 an intent count is set up in rate-changing buffer 13. Such intent count indicates the number of data records to be written within a defined write domain. At machine-step 185 buffer 13 is initialized to begin recording records, i.e., CBUF and DBUF are reset to a reference value, etc. At machine-step 186 the contents of cell 37 are obtained and the subsystem 19 reorients to that cell. It should be noted that in machine-step 184 the intent count is incremented by 1. If the intent count is unity after the increment, indicating that is was zero before the increment, then the entire write domain probably was terminated and must be established again. Such setting up the write domain was previously described and not repeated here. When all of the above operations following machine-steps 182, 183 are performed in any sequence, at machine-step 187 a device end (DE) is sent to host processor 10 indicating resumption of the operation. In machine-step 186 reorientation includes reorientation of cache 16 as well as reorienting to DASD 20. At machine-step 188 the command in the retry is received and machine-steps 171, et seq are repeated.

Figure 13:
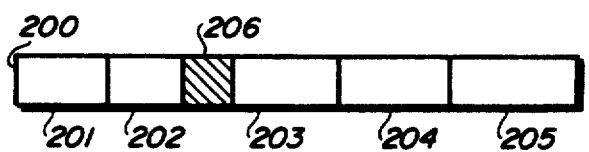
FIG. 13 diagrammatically illustrates cache segments used to store a copy of data from one track of DASD.

FIG. 13 shows a maximal number of cache segments used to store a full track. In the illustration, the cache segments shown in FIG. 13 collectively denominated by numeral 200 are shown as being contiguous, no such limitation is intended for an actual implementation of such within cache 16. The first segment 201 can store the contents of a track which is incomplete. That is, if the number of data bytes in the records stored into cache 16 from the DASD 20 does not fill a complete cache segment, then only one cache segment remains allocated for storing that track image in cache 16. TIB 17 portion for the current track is then stored in that one of the segments 200. If the data stored in segment 201 fills the segment sufficiently such that the maximum size of the TIB 17 cannot be stored in that one segment, then a second segment 202 is allocated to the track for storing the TIB indicated by numeral 206 in the denominated shaded area. Therefore, two segments 201 and 202 are allocated in cache 16 for storing a copy of data stored in a given track of DASD 20. If additional data records are then transferred to cache 16 for one reason or another, then the segments 201 and 202 not used by TIB 206 are used to store data. Such other data then is stored in the third allocated segment 203 or 204 and 205. Accordingly, the first data record transfer from DASD 20 to cache 16 however started can result in area 206 being in any one of the five segments which are required for storing the full track of data within cache 16.

Microprocessor 14 stores TIB in any cache segment having room for storing the TIB.

FIG. 14 is a simplified machine-operations chart showing an overall view of chaining operations in which the above described machine-operations may occur. The chain of channel commands follows the usual data chaining operations used by International Business Machines Corporation in their computers. Such chaining is well known and is not further described for that reason. At machine-step 211 the track TIB is copied from cache 16 into control store 15 for storage in TRK TIB 38. This action enables rapid updating of the contents by avoiding accessing cache 16. In machine-step 213, as records are transferred, the count fields are transferred to WK 39 portion of control store 15. At machine-step 214 it is determined whether or not the end of the current track is reached or there is an end of chain (EOC). If not, the record transfer within the chain continues. If it is either the end of track EOT or end of chain EOC, then at machine-step 215 the TRK TIB 38 is updated based upon the information stored in the work area WK 39 and a copy of TRK TIB 39 is stored in cache portion TIB 17. At an EOC, subsystem 19 may continue staging data from the current DASD track to cache 16 for having a complete copy of the current DASD track in cache 16. At this point in the machine-operations there may be a track switch occurring which requires another TIB for the next track to be stored in portion 38. From machine-step 215, the peripheral subsystem 19 at machine-step 216 determines whether or not more data records are to be transferred within the chain. If not, machine-operations exited as indicated by numeral 217 to perform other functions. Otherwise, machine-operations repeat are repeated by returning to steps 211 and 213.

While the invention has been particularly shown and described with reference to preferred embodiments thereof, it will be understood by those skilled in the art that various changes in form and details may be made therein without departing from the spirit and scope of the invention:

What is claimed is:

1. In a machine-effected method of operating a cached DASD subsystem having an attachment circuit means for attaching the cached DASD subsystem to a host processor, a cache having a plurality of addressable record storage locations, a rate-changing buffer, a control, a device attachment and one or more devices, a first bus means connected to the cache, the rate changing buffer and the attachment circuit means, a second but means connected to the cache, the rate changing buffer and the device attachment; said control being connected to the attachment circuit means, the rate changing buffer, the cache and the device attachment for controlling said rate changing buffer, cache, attachment circuit means and said device attachment and for initiating data record transfers over said first and second bus means, the device attachment being connected to all of the devices for controlling the devices and for transferring data between the device attachment and the devices, the data record transfers over said first and second bus means being bidirectional, each data record stored in said devices being addressable by a respective rotational position in a respective track of the respective devices, said data records including two types of data records, user-data records and control-data records, the data record transfers between said device attachment and the devices being bidirectional;

including machine-executed steps of:

in said control, responding to a first received command received from said attachment circuit means over said first bus means for commanding a single chain of data record transfers between said attachment circuit means, said rate changing buffer and said device attachment for sequential data record transfers respectively over said first and second bus means for transferring diverse types of data records between the attachment circuit means and one of the devices via said rate-changing buffer, and in the cache, receiving a copy of each record transferred over said second bus means for simultaneously placing a copy of each record transferred over the second bus means into the cache, during said simultaneous transfers, momentarily storing the data records being transferred in the rate-changing buffer;

in said control, receiving from said device attachment for storing, in a control store internal to the control, a rotational position indication of each record transferred over said second bus means as an indication of a rotational position of a last record transferred to or from said one device;

in said control, establishing a reference rotational position for a first record in each track of said device for addressing in said one device a first record being transferred between the one device and the attachment circuit means;

simultaneously to said data records being stored in said rate-changing buffer in a header creating step, in said control actuating said rate-changing buffer for accessing a given data record currently stored in the rate-changing buffer for creating a header for said given data record;

in said control in said header creating step, deriving a rotational position for each record stored in the rate-changing buffer from said stored rotational position, then inserting said derived rotational position into a respective header for the respective record stored in the rate-changing buffer, said derived rotational position hereafter termed a cell indication, and further inserting an indication of the type of data record into each header, then storing the header with the respective record in the rate-changing buffer and in the cache, repeating the header creating step for each record stored in the rate-changing buffer;

in said control, creating a track information block TIB for storage in said internal control store for identifying an addressable record location of each data record stored in the cache including storing the cell location and a cache address at which each data record is stored in the cache, upon each transfer of each respective record of data between the attachment circuit means and the rate-changing buffer over said first bus means, in said control, updating the TIB to include an identification of the data record location in the cache of the just transferred record, together with the cell and record type indications in the heater of said just transferred record;

in said control, responding to each transfer of a predetermined one of the data records being transferred in said chain of data record transfers for maintaining a separate single copy of said cell and data record type indications for said predetermined data record in the control separate from the indications in said data record header and said TIB; and in said control, receiving a second command over said first bus means from said attachment circuit means, said control responding to the second received command to fetch the separate single copy of said cell and record type for using the separately maintained copy of the cell in executing the received new command.

2. In the machine-effected method set forth in claim 1 further including, the machine-executed steps of:

in said rate-changing buffer, before the first received command is fully executed in the cached DASD subsystem, indicating to the control that the rate-changing buffer is full;

in the control, responding to the full indication for terminating the chain of data record transfers and terminating execution of said first received command; and in the control, then storing the cell indications for all records transferred over said first bus means in TRK table that is separate from the TIB, including establishing a separate TBK table for each data record transfer that includes addressing a respective track of said devices.

3. In the machine-effected method set forth in claim 2 further including the machine-executed steps of:

in said control, decoding said first received command to indicate a read data record transfer in which records are transferred from said one of the devices to the attachment circuit means;

in said control, reading a TRK table for a track from which the data records to be read from said one device for fetching identification of records to be read that are currently stored in the cache for indicating to the cache and to the device attachment that predetermined ones of the data records to be transferred from the one device to the attachment circuit means are currently stored in the cache; and in the cache, orienting its operation to the data record transfer including using the cell indication for orienting the cache operation to next access a first data record of the predetermined ones of the data records currently stored in the cache for transfer from the cache to the attachment circuit means over said first bus means.

4. In the machine-effected method set forth in claim 2 further including the machine-executed steps of:

during said data record transfer between said one of the devices and the attachment circuit means, in said control, monitoring, in the TRK table, the data record transfers and the data record contents of the cache for detecting a predetermined relationship between the data records being transferred between said one device and the attachment circuit means and the data records currently stored in the cache; and in the cache orienting cache operation to the cell of one of the data records being transferred between the attachment circuit means and the one device and then transferring records between the cache and the attachment circuit means beginning with a cache orientation indicated by said cell of the one record and the device attachment stopping data record transfers with the one device.

5. In the machine-effected method set forth in claim 1 further including the machine-executed steps of:

in the control, while maintaining the separate copy of said indications, detecting that the transfer of the data record indicated by the TIB is to be repeated;

in said control, responding to said detecting a repeat of a record transfer to indicate to the attachment circuit means that the data record transfer is to be repeated and that a delay in subsystem operation will ensue; and then, in said device attachment reorienting the one device operation to the orientation of the cache operation for repeating the data record transfer.

6. In the machine-effected method set forth in claim 1 further including the machine-executed steps of:

during said chain of data record transfers, in said rate-changing buffer in a first one of said simultaneous data record transfers overlaying previously transferred data records transferred in a second one of said simultaneous data record transfers and still stored in the rate-changing buffer with data records being transferred in said first one of said simultaneous data record transfers;

in said control, indicating that a predetermined number of the transferred records are to be transferred again; and in said control, inhibiting said rate-changing buffer from overlaying records in the rate-changing buffer, then, in the control actuating the attachment circuit means, the rate-changing buffer and the device attachment to re-transfer the data records between the one device and the attachment circuit means including transferring the data records currently stored in the rate-changing buffer as records being retransferred between the attachment circuit means and the one device.

7. In the machine-effected method set forth in claim 6 further including the machine-executed steps of:

in said control, terminating the chain of data record transfers and storing the cell indications in a TRK table in said internal control store to identify the addressable record storage locations in the cache wherein the respective records are stored, making said TRK table to be separate from said TIB; and after the steps of terminating the record data transfer and of indicating that the predetermined number of transferred records are to be transferred again, in the control, fetching from the TRK table a cell indication that identifies a first record to be retransferred, then in the cache reorienting the cache operation to the rotational position indicated by the fetched cell indication and in the device attachment reorienting the operation of the one device to the rotational position indicated by the fetched cell indication.

8. In the machine-effected method set forth in claim 1 further including the machine-executed steps of:

in said single chain of data record transfers, transferring data records from the attachment circuit means through the rate-changing buffer, then simultaneously storing a copy of each said data record in the cache and in the one device;

in the attachment circuit means indicating to the control that a predetermined one of the data records simultaneously transferred to the cache and the one device is to be retransferred;

then, in said control, fetching the cell indication contained in the header of the predetermined one record stored in the cache, then, in the device attachment, reorienting the operation of the one device to the rotational position stored in the fetched cell indication and in the cache reorienting cache operation to the rotational position stored in the fetched cell indication; and in the cached DASD subsystem, retransferring, between the one device, the cache and the attachment circuit means in said simultaneously data record transfers, the predetermined data record and continuing the data record transfer for data records having cells indicated by the respectively maintained indications generated in said maintaining step.

9. In the machine-effected method set forth in claim 1 further including the machine-executed steps of:

in said single chain of data record transfers, in said rate-changing buffer, overlaying data records stored in the rate-changing buffer as such overlaid data records are read from the rate-changing buffer;

in said control, establishing a retry state for the cached DASD subsystem during which a predetermined data record transfer is repeated for transferring a predetermined data record through the rate-changing buffer;

in said rate-changing buffer, inhibiting the overlaying of data records stored in the rate-changing buffer during said established retry state;

in the cache, reorienting the cache operation to the rotational position indicated in said maintained separate copy of the cell indication and in the device attachment reorienting one device operation to the rotational position indicated in said maintained separate copy of said cell indication;

then, repeating said transfer of the predetermined record without overlaying any records currently stored in the rate-changing buffer; and after completing said repeating step, in said rate-changing buffer, overlaying records currently stored in the rate-changing buffer with records being stored in the rate-changing buffer.

10. In the machine-effected method set forth in claim 1 further including the machine-executed steps of:

in the cached DASD subsystem, completing the single chain of data record transfers;

in said control, responding to the completion of the single chain of data record transfers for actuating the attachment circuit means to fetch the cell indication stored in the header of a last record transferred, examining the type of data record indication in said fetched header, if the fetched indication indicates that a last data record transferred is a control-data record, then changing the cell indication in said header and said TIB equal to zero, else fetching the cell indication maintained as said separate copy after transfer of the predetermined data record, then changing the cell indication in said header and said TIB equal to the cell indication in said separate copy.

11. In the machine-effected method set forth in claim 10 further including the machine-executed steps of:

in the cached DASD subsystem during said single chain of data record transfers, transferring a plurality of the data records including repeating the steps of maintaining the indications in said single chain of such record transfers;

terminating the single chain of data record transfers, then, in said control, storing the indications in a TRK table in said internal control store to identify the addressable locations in the cache wherein the respective data records are stored, said TRK table being separate from said TIB; and in said control, fetching the last maintained cell indication from the TRK table.

12. In the machine-effected method set forth in claim 1 further including the machine-executed steps of:

in said cached DASD subsystem, sequentially transferring records from the attachment circuit means to the one device via said rate-changing buffer in a write operation and transferring records to be read from the one device to the attachment circuit means from the one device via the rate-changing buffer as a read operation; and after completing said write and read operations, respectively, in said control, maintaining the single cell indications for records transferred in said write operation separately from the cell indications for records transferred in said read operation.

13. In the machine-effected method set forth in claim 12 further including the machine-executed steps of:

in the cached DASD subsystem, interleaving the read and write operations, in said control, maintaining the cell indications independently for the read and write operations such that retransfer of any record in either a read or write operation can be oriented by the respective maintained single cell indications.

14. In the machine-effected method set forth in claim 1 further including the machine-executed steps of:

in said single chain of data record transfers, transferring a plurality of data records;

in the control, during said single chain of record transfers, indicating as a copy indication whether or not a copy of all data records of said single chain of data records being transferred are retentively stored in a device of the cached DASD subsystem; and in said maintaining step, changing the separately stored single cell and type indications only upon completing a transfer of a record to the one device if said copy indication indicates that a copy of all data records in the single chain of data records being transferred is retentively stored in the one device.

15. In the cached DASD subsystem having an attachment circuit means for attaching the cached DASD subsystem to a host processor, a cache, a rate-changing buffer, a control, a device attachment and one or more devices, first bus means interconnecting the attachment circuit means, the cache, the rate-changing buffer, second bus means interconnecting the cache, the rate changing buffer and the device attachment, the device attachment being connected to the devices for controlling the devices and for bidirectionally exchanging data with the devices, the control being connected to the attachment circuit means, the cache, the rate-changing buffer and the device attachment for bidirectionally initiating data transfers over said first and second bus means and between the device attachment and any one of said devices; including, in combination:

the control means actuating the attachment circuit means and one of the devices for transferring records of data between the attachment circuit means and said one of the devices via said rate-changing buffer and for simultaneously placing a copy of each record in the cache;

said control means having header means for creating a header for each record that includes a rotational position cell indication of the one device and an indication of a type of record and storing the header with the respective record in the rate-changing buffer and in the cache;

said control means having directory means connected to the cache for maintaining a directory of a location in cache that each exchanged record is stored in cache, including means for updating the directory upon completion of each transfer of a record between the attachment circuit means and the one device;

said control means having maintaining means active upon completing each transfer of each record between the attachment circuit means and the rate-changing buffer for maintaining a separate copy of said indications in the control means which copy is separate from the directory means and the rate changing buffer; and said attachment circuit means receiving a new command from a connected host processor for actuating the control means to execute the command and said control means using the separate copy of the cell in executing the command.

16. In the cached DASD subsystem set forth in claim 15 further including, in combination:

the control means having a TRK table for storing the indications for all records stored in cache;

chain means in the control means of the cached DASD subsystem for actuating the one device, the cache and the attachment circuit means for transferring a plurality of the records as a chain of data transfers between said one device and said attachment circuit means; and terminating means in the chain means for terminating the chain of data transfers and for actuating the control means to store the indications in said TRK table of such indications for identifying the locations in cache where the respective records are stored.

17. In the cached DASD subsystem set forth in claim 16 further including, in combination:

said control means actuating the attachment circuit means, the cache and the one device to make the transferring of the records a read operation in said chain of record transfers in which records are transferred from said one of the devices to the attachment circuit means;

said control means having cache content means connected to the chain means for indicating during said chain of record transfers that predetermined ones of the records to be transferred to the attachment circuit means are stored in cache;

said control means having orienting means connected to the cache for orienting operation of the cache to the record transfer including using the separate cell indication for the last record transferred from the one device to the attachment circuit means for orienting the cache operation to next access a first record of the predetermined ones of the records for the transfer from the cache to the attachment circuit means.

18. In the cached DASD subsystem set forth in claim 16 further including, in combination:

said control means having monitoring means connected to the rate changing buffer and being active during said record transfer through the rate changing buffer and between the one of the devices and the attachment circuit means for monitoring the record transfers and the record contents of the cache for detecting a predetermined relationship between the records being transferred between said one device and the attachment circuit means and the records stored in the cache before said chain of record transfers; and said control means having means for orienting cache operation to the cell indication of a one of the records being transferred between the attachment circuit means and the one device and then for actuating the cache and attachment circuit means for transferring records between the cache and the attachment circuit means beginning with a cache orientation indicated by said cell of the one record and for stopping data transfers with the one device.

19. In the cached DASD subsystem set forth in claim 15 further including, in combination:

said control means while maintaining the separate copy of said indications, detecting that the record transfer of the record indicated by the maintained separate copy of indications is to be repeated;

the control means responding to said detecting that said record transfer is to be repeated for actuating the attachment circuit means to repeat the transfer of the last transferred record and that a delay in subsystem operation will ensue;

said orienting means being responsive to the control means actuating the attachment circuit means to repeat the transfer for re-orienting the one device operation to the orientation of the cache; and said control means being operative upon said reorientation of the one device for actuating the attachment circuit means, the cache and the one device for repeating the record transfer.

20. In the cached DASD subsystem set forth in claim 15 further including, in combination:

said control means activating the attachment circuit means, the rate-changing buffer and device attachment for transferring records from the attachment circuit means to the cache and to the one device;

means in the attachment circuit means for indicating that a predetermined one of the records transferred to the cache and the one device is to be retransferred; said control means being responsive to the indication of the predetermined one of the records is to be re-transferred for fetching the separate copy of the cell indication of the predetermined one record and reorienting the operation of the one device and cache to the rotational position stored fetched cell indication; and said attachment circuit means and buffer means being responsive to the control means reorienting the one device and cache for transferring the predetermined one of the records and continuing the record transfer.

21. In the cached DASD subsystem set forth in claim 15 further including, in combination:

said control means having chain means for establishing a chain of a plurality of records and for completing the chain of record transfers, chain end means in the chain means for actuating the control means to fetch the separate cell indication of the last record transferred, said control means having control record means for sensing the type of a last record transferred and being responsive to the type of the last record transferred being a control record for making the cell indication zero, else fetching the separate cell indication maintained for the last record transferred.

22. In the cached DASD subsystem set forth in claim 15 further including, in combination:
   means in the control means for effecting transferring records from the attachment circuit means to the one device as a write operation and to the attachment circuit means from the one device as a read operation; and
   said control means having separate copy means connected to the cache for maintaining the cell indications for records transferred in a write operation separately from the separate cell indications for records transferred in a read operation.

23. In the cached DASD subsystem set forth in claim 22 further including, in combination:
   said attachment circuit means having means for interleaving the read and write operations and maintaining the separate cell indications independently for the read and write operations such that retransfer of any record in either a read or write operation can be oriented by the respective maintained cell indication.

* * * * *

UNITED STATES PATENT AND TRADEMARK OFFICE
CERTIFICATE OF CORRECTION

PATENT NO. : 5,235,692

DATED : August 10, 1993

INVENTOR(S) : Kathryn J. Ayres, et al.

It is certified that error appears in the above-identified patent and that said Letters Patent is hereby corrected as shown below:

At column 16, line 62, the word "heater" should be --header--.

At column 17, line 23, the words "separate TBK table" should be --separate TRK table--.

Signed and Sealed this

Nineteenth Day of April, 1994

*Attest:*

BRUCE LEHMAN

*Attesting Officer*      *Commissioner of Patents and Trademarks*